(12) United States Patent
Chen et al.

(10) Patent No.: US 9,626,289 B2
(45) Date of Patent: Apr. 18, 2017

(54) METALBLOCK RELINKING TO PHYSICAL BLOCKS OF SEMICONDUCTOR MEMORY IN ADAPTIVE WEAR LEVELING BASED ON HEALTH

(71) Applicant: SanDisk Technologies Inc., Plano, TX (US)

(72) Inventors: Lei Chen, Sunnyvale, CA (US); Xinde Hu, San Jose, CA (US); Zhenlei Shen, Milpitas, CA (US); Yiwei Song, Union City, CA (US); Gautam Dusija, Milpitas, CA (US)

(73) Assignee: SanDisk Technologies LLC, Plano, TX (US)

( * ) Notice: Subject to any disclaimer, the term of this patent is extended or adjusted under 35 U.S.C. 154(b) by 2 days.

(21) Appl. No.: 14/471,465

(22) Filed: Aug. 28, 2014

(65) Prior Publication Data

US 2016/0062881 A1 Mar. 3, 2016

(51) Int. Cl.
*G06F 12/00* (2006.01)
*G06F 12/02* (2006.01)

(52) U.S. Cl.
CPC ...... *G06F 12/0246* (2013.01); *G06F 12/0253* (2013.01); *G06F 2212/1016* (2013.01);
(Continued)

(58) Field of Classification Search
CPC ........... G06F 12/0246; G06F 2212/721; G06F 2212/7208; G06F 2212/7201; G06F 11/1658; G06F 2212/7205; G06F 2212/7206; G06F 2212/7211; G06F 12/0253; G06F 2212/7207; G06F 3/0679; G06F 2212/2022; H01L 2924/00
(Continued)

(56) References Cited

U.S. PATENT DOCUMENTS 7,433,993 B2 * 10/2008 Sinclair .............. G06F 12/0246
711/103
8,187,936 B2 5/2012 Alsmeier et al.
(Continued)

FOREIGN PATENT DOCUMENTS

WO WO 2008/082950 A1 7/2008

OTHER PUBLICATIONS

U.S. Appl. No. 14/133,979, filed Dec. 19, 2013, 121 pages.
(Continued)

*Primary Examiner* — Hong Kim
(74) *Attorney, Agent, or Firm* — Brinks Gilson & Lione (57) ABSTRACT

Systems and methods for metablock relinking may be provided. A first physical block of a first metablock may be determined to have a different health than a second physical block of a second metablock based on health indicators of the first and second physical blocks. Each of the health indicators may indicate an extent to which a respective one of the first and second physical blocks may be written to and/or erased before the respective one of the first and second physical blocks becomes defective. The first physical block of the first metablock may be replaced with the second physical block of the second metablock based on a determination that the health of the first physical block of the first metablock is different than the health of the second physical block of the second metablock.

18 Claims, 4 Drawing Sheets

(52) U.S. Cl.
CPC ............... *G06F 2212/7205* (2013.01); *G06F 2212/7208* (2013.01); *G06F 2212/7211* (2013.01)

(58) Field of Classification Search
USPC ................ 714/5.1; 707/813, 828, 830, 831; 711/103, 170
See application file for complete search history.

(56) References Cited

U.S. PATENT DOCUMENTS

| | | | |
|---|---|---|---|
| 2005/0144516 A1 | 6/2005 | Gonzalez et al. | |
| 2008/0091901 A1* | 4/2008 | Bennett | G06F 12/0246 711/165 |
| 2008/0109591 A1 | 5/2008 | Kim et al. | |
| 2008/0162612 A1* | 7/2008 | Tomlin | G06F 12/0246 |
| 2008/0313505 A1* | 12/2008 | Lee | G06F 12/0246 714/47.2 |
| 2009/0089482 A1* | 4/2009 | Traister | G06F 12/0246 711/103 |
| 2009/0292944 A1* | 11/2009 | Gonzalez | G06F 12/0246 714/5.1 |
| 2011/0219174 A1* | 9/2011 | Gorobets | G06F 11/1072 711/103 |
| 2012/0191927 A1* | 7/2012 | Gorobets | G06F 12/0246 711/156 |
| 2014/0281141 A1* | 9/2014 | Manohar | G06F 12/0246 711/103 |
| 2014/0289447 A9* | 9/2014 | Flynn | G06F 9/52 711/103 |
| 2015/0178191 A1* | 6/2015 | Camp | G06F 12/0246 711/103 |
| 2015/0179659 A1* | 6/2015 | Takaki | H01L 21/76895 257/5 |
| 2015/0179660 A1* | 6/2015 | Yada | H01L 21/02164 257/321 |
| 2016/0004464 A1* | 1/2016 | Shen | G06F 3/0619 711/103 |
| 2016/0041870 A1* | 2/2016 | Davis | G06F 11/1008 714/773 |

OTHER PUBLICATIONS

U.S. Appl. No. 14/136,103, filed Dec. 20, 2013, 56 pages.

Jang et al., "Vertical Cell Array using TCAT (Terabit Cell Array Transistor) Technology for Ultra High Density NAND Flash Memory," *2009 Symposium on VLSI Technology Digest of Technical Papers*, pp. 192-193, 2009.

Arya, P., "A Survey of 3D Nand Flash Memory", *EECS Int'l Graduate Program, National Chiao Tung University*, 2012, pp. 1-11.

Nowak, E. et al., "Intrinsic Fluctuations in Vertical NAND Flash Memories", *2012 Symposium on VLSI Technology Digest of Technical Papers*, 2012, pp. 21-22.

* cited by examiner

METALBLOCK RELINKING TO PHYSICAL BLOCKS OF SEMICONDUCTOR MEMORY IN ADAPTIVE WEAR LEVELING BASED ON HEALTH

BACKGROUND

1. Technical Field

This application relates to semiconductor memory and, in particular, to relinking of metablocks.

2. Related Art

Arrays of nonvolatile memory cells in semiconductor memory may be divided into groups to provide for efficient implementation of read, program and erase functions. For example, the memory cells may be arranged into a group called a unit of erase.

The unit of erase may be the smallest number of memory cells that are erasable at a time. An example of the unit of erase may be a block.

The block may be referred to as a physical block to distinguish the physical block from a logical block of a block storage device. A file system may map each logical block of a block storage device to one or more corresponding physical blocks. The file system may map files to logical blocks, which are mapped to the physical blocks.

The physical block may be partitioned into individually addressable pages. Pages may be the basic unit for reading and programming user data (unit of reading and/or programming).

In some examples, the physical blocks may be grouped together to form metablocks or "super" blocks. The metablocks may be considered a physical construct even though the metablocks are logical groupings of physical blocks. This is because the file system may map each logical block of a block storage device to a corresponding metablock as if the metablock were a large physical block.

Using metablocks may improve the reliability of the semiconductor memory because the physical blocks of the metablock may be distributed across physical structures of the semiconductor memory, such as dies and/or planes. Read and/or write speeds of the semiconductor may also be improved with metablocks because the physical block on each respective physical structure may be read and/or written in parallel with the blocks of the metablock on the other physical structures. However, if any of the physical blocks of the metablock becomes defective, then the metablock may be mapped to an entirely new set of physical blocks. As a result, the original physical blocks of the metablock that were not defective may no longer be used, thereby reducing the overall life of the semiconductor memory.

SUMMARY

To improve the service life of semiconductor memory, a metablock relinking system may be provided that includes semiconductor memory, a health analyzer, and a relinker. The semiconductor memory may include physical blocks, where each one of multiple metablocks is mapped to a corresponding set of the physical blocks, and where physical blocks included in the corresponding set of physical blocks of each of the metablocks are distributed across structures of the semiconductor memory. The health analyzer may determine a first metablock is to be relinked based on a health of the first metablock, where the first metablock includes no defective physical blocks. In response to a determination that the first metablock is to be relinked, the relinker may replace a first physical block of the first metablock with a second physical block of a second metablock based on a health of the first metablock relative to a health of the second physical block, wherein the first physical block and the second physical block are on one of the structures of the semiconductor memory.

An apparatus for metablock relinking may be provided that includes a wear leveling module. The wear leveling module may determine a first physical block of a first metablock has a different health than a second physical block of a second metablock based on health indicators of the first and second physical blocks, each of the health indicators may indicate an extent to which a respective one of the first and second physical blocks may be written to and/or erased before the respective one of the first and second physical blocks becomes defective. The wear leveling module may replace the first physical block of the first metablock with the second physical block of the second metablock based on a determination that a health of the first physical block of the first metablock is different than the second physical block of the second metablock.

A method to relink metablocks may be provided. A first metablock mapped to a set of physical blocks of a semiconductor memory may be selected. Each one of multiple metablocks of the semiconductor memory is mapped to a corresponding set of physical blocks. Physical blocks included in the corresponding set of physical blocks of each of the metablocks are distributed across structures of the semiconductor memory. A determination may be made that the first metablock is to be relinked based on a health indication of the first metablock even though none of the physical blocks of the first metablock are defective. In response to a determination that the first metablock is to be relinked, a first physical block of the first metablock may be replaced with a second physical block of a second metablock, where the first physical block is on a same one of the structures of the semiconductor memory as the second physical block.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Methods and apparatuses to relink metablocks may be provided to improve the service life of semiconductor memory. Each metablock in the semiconductor memory may be mapped to a corresponding set of physical blocks in the semiconductor memory. Physical blocks that are included in the corresponding set of physical blocks of each of the metablocks may be distributed across structures of the semiconductor memory, such as across dies, chips, or planes. A first metablock that is mapped to a first set of physical blocks in a semiconductor memory may be selected. In some examples, the first metablock may be selected from a free block pool in response to a write command issued to write host data to the semiconductor memory. The first metablock may be selected from the free block pool based on, for example, the first metablock having the best health of the metablocks in the free block pool. The best health may be determined based on health indicators of the metablocks and/or or the physical blocks of the metablocks. The health indicators may be Block Health Meter (BHM), for example.

Each of the health indicators may indicate an extent to which a corresponding memory unit, such as the metablock and/or one or more of the blocks of the metablock, has been written to and/or erased. Alternatively or in addition, the health indicator may indicate an extent to which the memory unit may be written to and/or erased before the memory unit becomes defective. In other words, the health indicator may provide an indication of an extent of the remaining life of the memory unit and/or an indication of an extent of the consumed life of the memory unit.

One example of the health indicator may be Block Health Meter (BHM). The BHM may be determined as:

$$BHM = a \cdot \frac{FBC}{FBC_n} + b \cdot \frac{PEC}{PEC_n}$$

where FBC is a failed bit count from the block; $FBC_n$ is a normalization factor for FBC; PEC is program/erase cycle (PE cycle) from the block; $PEC_n$ is a normalization factor for PEC; a is the weight of the FBC component in the BHM calculation; b is the weight of the PEC component in the BHM calculation; and where a+b=1.

The lower the BHM, the healthier the block. The higher the BHM, the less healthy the block. The health indicator of the metablock may be a function of the health indicators of the blocks included in the metablocks. For example, the health indicator of the metablock may be equal to the health indicator of the least healthy block of the metablock.

A second example of the health indicator may be simply the PE cycle of the block. A third example of the health indicator may be an error rate of the block, such as a failed bit count. The failed bit count may be a number of bits that differ between data written to the block and data subsequently read from the block. The health indicator may be based on the PE cycle and/or the error rate of the block. Alternatively or in addition, the health indicator may be any indicator of health of a non-defective block.

The health indicators may be determined at the time at which the first metablock is selected. Alternatively or in addition, the health indicators may be determined at another time, such as in a background process like a static wear leveling process.

A determination may be made whether the first metablock is to be relinked based on a health indication of the first metablock. In one such example, the determination that the first metablock is be relinked may be made based on a determination that a variance in health of physical blocks of the first metablock exceeds a threshold level.

In response to a determination that the first metablock is to be relinked, a first physical block of the first metablock may be replaced with a second physical block of a second metablock based on the second physical block being healthier than the first physical block. The first physical block and the second physical block may be on a common structure of the semiconductor memory such as on a plane, a die, and/or a chip of the semiconductor memory.

Replacing the first physical block with the second physical block may be part of a swap in some examples. For example, in response to the determination that the first metablock is to be relinked, the first physical block of the first metablock may be swapped with the second physical block of the second metablock.

In some examples, in response to the determination that the first metablock is to be relinked, each respective physical block of the first metablock may be swapped with a corresponding physical block of one or more other metablocks if the corresponding physical block is healthier than the respective physical block of the first metablock and is located on the same one of the structures that the respective physical block of the first metablock.

In some examples, the systems and methods described below may attempt to equalize the health of blocks within a metablock. Equalizing the health of blocks within a metablock may improve the overall service life of semiconductor memory. In some examples, the systems and methods described below may write to healthier metablocks more frequently than less healthy metablocks. Doing so may improve the endurance of the semiconductor memory in some examples.

Figure 1A:
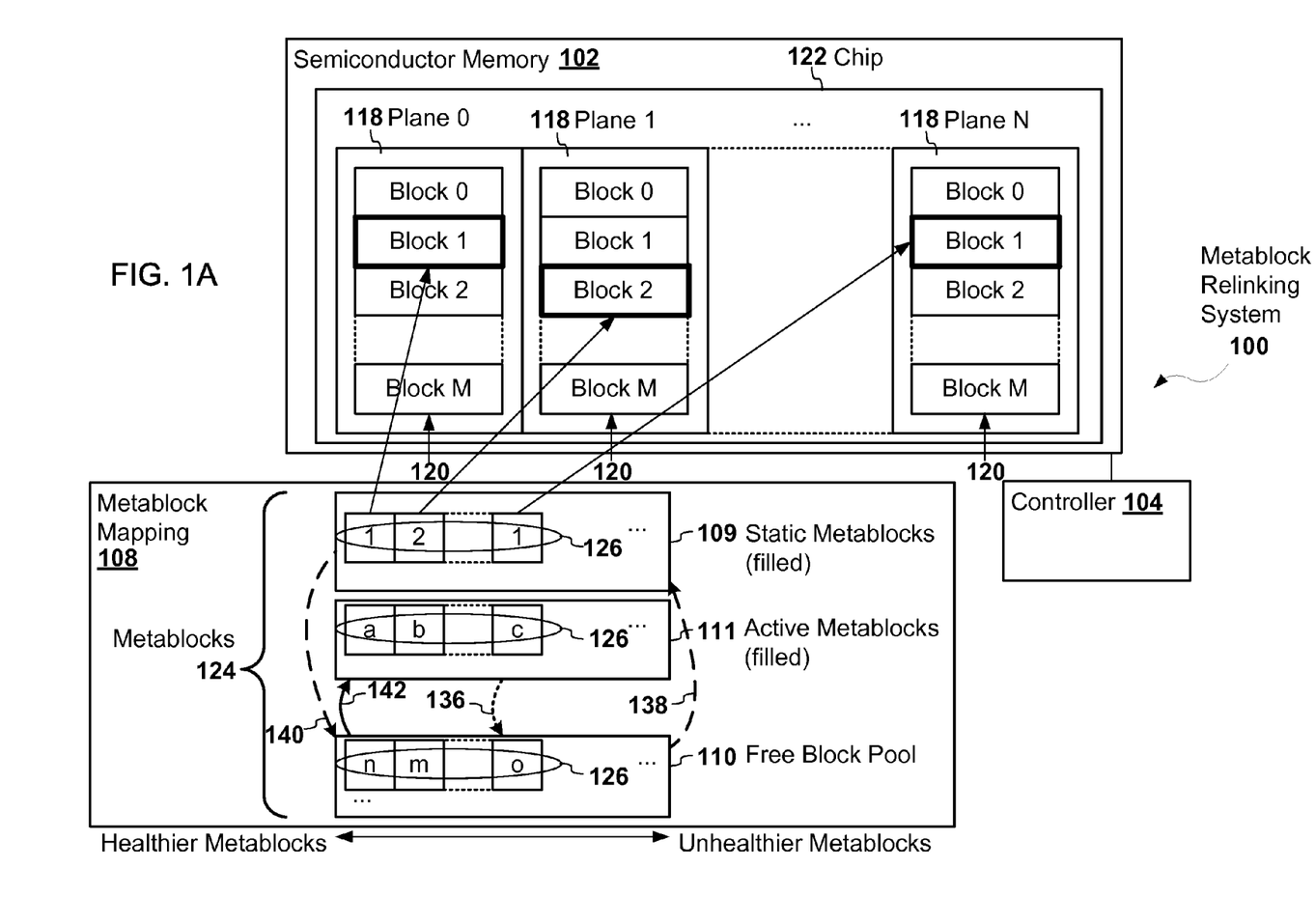
FIG. 1A illustrates an example of a metablock relinking system with a controller.
Figure 1B:
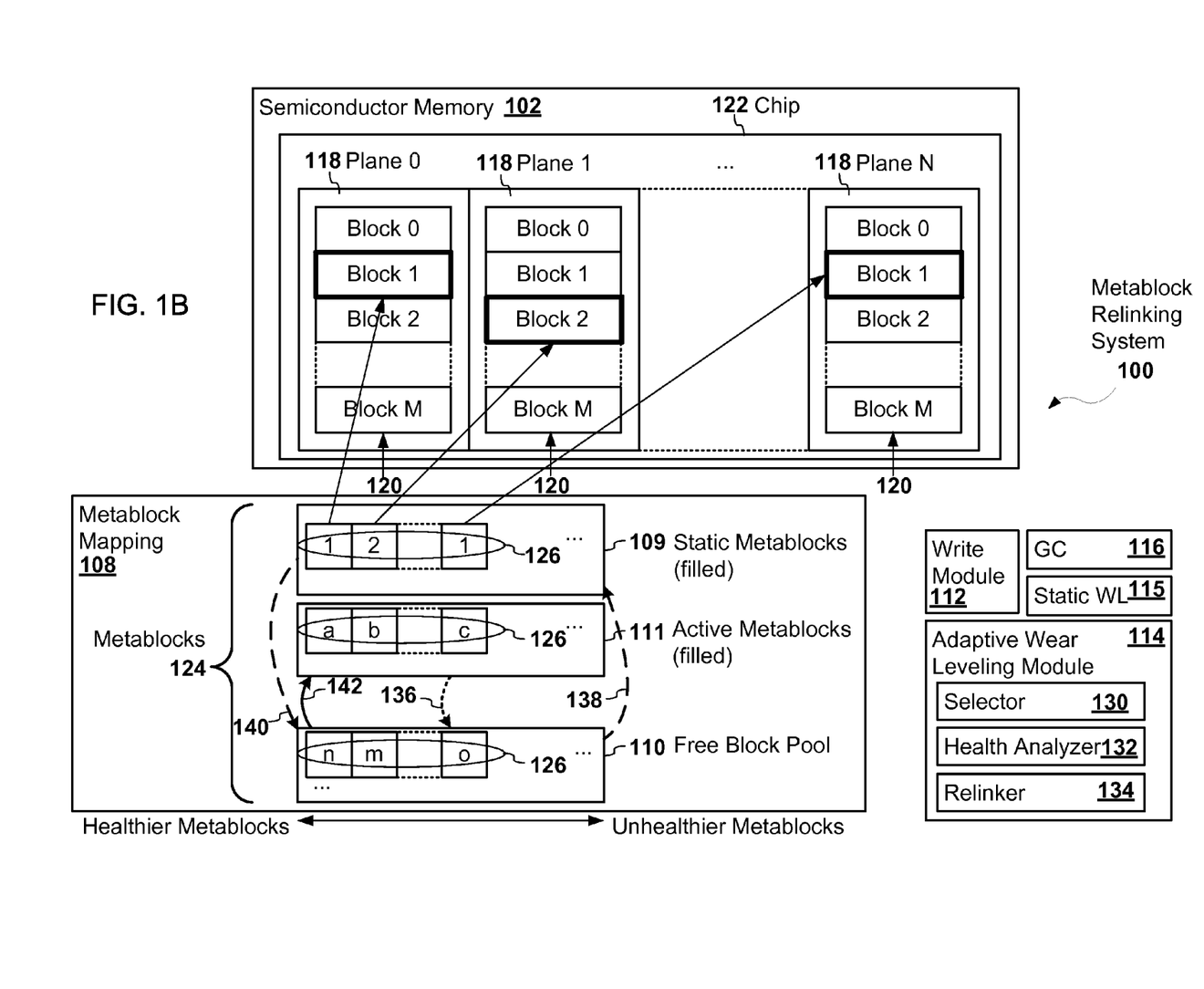
FIG. 1B illustrates an example of a metablock relinking system with hardware modules.

FIGS. 1A and 1B illustrate examples of a metablock relinking system 100. The system 100 may include a semiconductor memory 102, a controller 104, a metablock mapping 108, a free block pool 110, a set of active metablocks 109, and a set of static metablocks 111 as illustrated in FIG. 1A. The controller 104 in FIG. 1A may have internal or external memory that includes controller processor executable code for carrying out one or more features described below. In the example illustrated in FIG. 1B, the system 100 may include a write module 112, an adaptive wear leveling module 114, a static wear leveling module 115, and a garbage collection module 116 but may or may not include the controller 104.

The semiconductor memory 102 may be any memory formed from semiconductor material. Examples of the semiconductor memory 102 may include NAND type flash memory, NOR type flash memory, static random access memory (SRAM), dynamic random access memory (DRAM) memory, electrically erasable programmable read only memory (EEPROM), or any other type of solid state memory. The semiconductor memory 102 may include physical structures 118, such as planes (designated as planes 0 to N in FIGS. 1A and 1B), dies and/or chips 122. The semiconductor memory 102 may include physical blocks 120. The physical blocks 120 may be arranged on the physical structures 118.

Metablocks 124 may be groupings of the physical blocks 120. In particular, each of the metablocks 124 may be mapped to a corresponding set 126 of the physical blocks 120. In other words, each of the metablocks 124 may be linked to the corresponding set 126 of the physical blocks 120. The metablocks 124 may each include a predetermined number of the physical blocks 120, such as eight physical blocks or any other number of physical blocks.

The physical blocks 120 that are included in the corresponding set 126 of physical blocks 120 of each of the metablocks 124 may be distributed across the structures 118 of the semiconductor memory 102. For example, the physical blocks 120 included in the corresponding set 126 of one of the metablocks 124 illustrated in FIGS. 1A and 1B include, among others, block 0 in plane 0, block 2 in plane 1, and block 1 in plane N. Each one of the physical blocks 120 of each metablock may be in a different one of the structures 118 than the other physical blocks of the metablock. Such distribution of the blocks 120 across the structures 118 may be referred to as "interleaving." Types of interleaving may include, for example, plane, die, and/or chip interleaving.

The metablock mapping 108 may map each of the metablocks 124 to the corresponding set 126 of the physical blocks 120. In a first example, the metablock mapping 108 may include a table that identifies a set of block numbers for each of the metablocks 124. In a second example, the metablock mapping 108 may include a rule and an exception table. The rule may map a metablock identified by a number k to the blocks 120 using an algorithm in which each of the blocks 120 of the metablock may be determined as a function of k. One such rule is a rule in which the blocks 120 of metablock k are the blocks 120 identified by offset k in each of the structures 118. The exception table may identify any of the physical blocks 120 of the metablock that do not follow the rule of the metablock mapping 108. Alternatively, the metablock mapping 108 may include any mechanism for mapping each of the metablocks 124 to the corresponding set 126 of the physical blocks 120.

The free block pool 110 may identify the metablocks 124 that are available to store host data. In contrast, the metablocks 124 that currently store host data, such as the static metablocks 109 and the active metablocks 111, may not be considered free and, thus, may not be included in the free block pool 110.

The static metablocks 109 and the active metablocks 111 may be the metablocks 124 that currently store host data. The static metablocks 109 may include the metablocks 124 that have been written to less frequently and/or less recently than the active metablocks 126. For example, the active metablocks 111 may include the metablocks 124 that have been written to within a predetermined time period, and the static metablocks 109 may include the metablocks 124 that have not been written to within the predetermined time period.

The metablocks 124 in each of the static metablocks 109, active metablocks 111, and free block pool 110 are illustrated in FIGS. 1A and 1B as ordered from healthier to less healthy. However, the metablocks 124 within each group 109, 111 and 110 may be in any order or be unordered.

The controller 104 may be any hardware based component that translates logical addresses, such as logical block addresses (LBAs), which may be received from a host system, into appropriate signaling to access corresponding physical memory in the semiconductor memory 102. Examples of the corresponding physical memory may include the physical blocks 120, subsets of the physical blocks 120 (for example, pages and/or word lines) and/or groups of the physical blocks 120 (for example, the metablocks 124). Examples of the controller 104 may include a memory controller, a NAND controller, a NOR controller, a microcontroller, and/or any other type of controller.

The controller memory may be any type of memory that the controller 104 may read and/or write. For example, the controller memory may include read only memory (ROM), dynamic random access memory ("DRAM") or static random access memory ("SRAM"), non-volatile memory, such as resistive random access memory ("ReRAM"), and/or electrically erasable programmable read only memory ("EEPROM"). The controller memory may be different memory than the semiconductor memory 102. Alternatively or in addition, the controller memory may be included, in whole or in part, in the semiconductor memory 102. In still other examples, the controller 140 may include all or a portion of the controller memory.

The write module 112 may be a component that writes host data to the semiconductor memory 102. The garbage collection module 116 may be a component that consolidates data stored in the metablocks 124 of the active metablocks 111 and/or the static metablocks 109 thereby releasing (136) one or more metablocks to the free block pool 110. The static wear leveling module 115 may be a component that identifies healthier metablocks of the static blocks 109, relocates (138) the data stored on the identified metablocks to less healthy metablocks of the free block pool 110, and releases (140) the identified healthier blocks to the free block pool 110.

The adaptive wear leveling module 114 may be a component relinks the metablocks 124 based on health of the metablocks 124. The adaptive wear leveling module 114 may include a selector 130, a health analyzer 132, and a relinker 134. The selector 130 may be a component that selects one or more of the metablocks 124 for processing. The health analyzer 132 may be a component that determines whether any of the selected metablocks is to be relinked based on the health of the selected metablock or metablocks. The relinker 124 may be a component that changes the metablock mapping 108 if the health analyzer 132 determines that the selected metablock(s) is to be relinked.

Each of the metablocks 124 may have a corresponding health. Similarly, each of the physical blocks 120 may have a corresponding health. The health of any of the metablocks 124 may be a function of the health of one or more of the physical blocks of the metablock. The health may be an indication of the health of the metablock and/or one or more of the blocks 120 of the metablock instead of the actual health. The health may be determined from a health indicator, such as BHM.

During operation of the metablock relinking system 100, the adaptive wear leveling module 114 may organize and/or relink the blocks 120 in the metablocks 124 so that healthier blocks may be written to more frequently than less healthy blocks. Accordingly, the overall service life of the semiconductor memory 102 may be extended.

The selector 130 of the adaptive wear leveling module 114 may select one or more of the metablocks 124 for potential relinking. In some examples, the selector 130 may select a healthiest of the metablock(s) of the free block pool 110 in response to a write command that is a request to write host data to the semiconductor memory 102. The write module 112, as part of the execution of the write command, may direct the adaptive wear leveling module 114 to select the metablock(s) to which the host data is to be written. Alternatively or in addition, the selector 130 may select the metablock(s) from the free block pool 110 in response to a request by static wear leveling module 115. For example, the static wear leveling module 115 may request the unhealthiest metablock of the free block pool 110 in order to store data that is stored on one of the healthier of the static metablocks 109, thereby freeing the healthier of the static metablocks 109.

The selector 130 may select the metablock(s) from the free block pool 110 based on the metablock(s) having the best health of the metablocks 124 in the free block pool 110. Alternatively or in addition, the selector 130 may select the metablock(s) from the free block pool 110 that have a health exceeding a threshold level. Alternatively or in addition, the selector 130 may select the metablock(s) from the free block pool 110 that have the worst health of the metablocks 124 in the free block pool 110 if requested by the static wear leveling module 115. Alternatively or in addition, the selector 130 may select the metablock(s) from the free block pool 110 whose health meets one or more other criteria.

Figure 2:
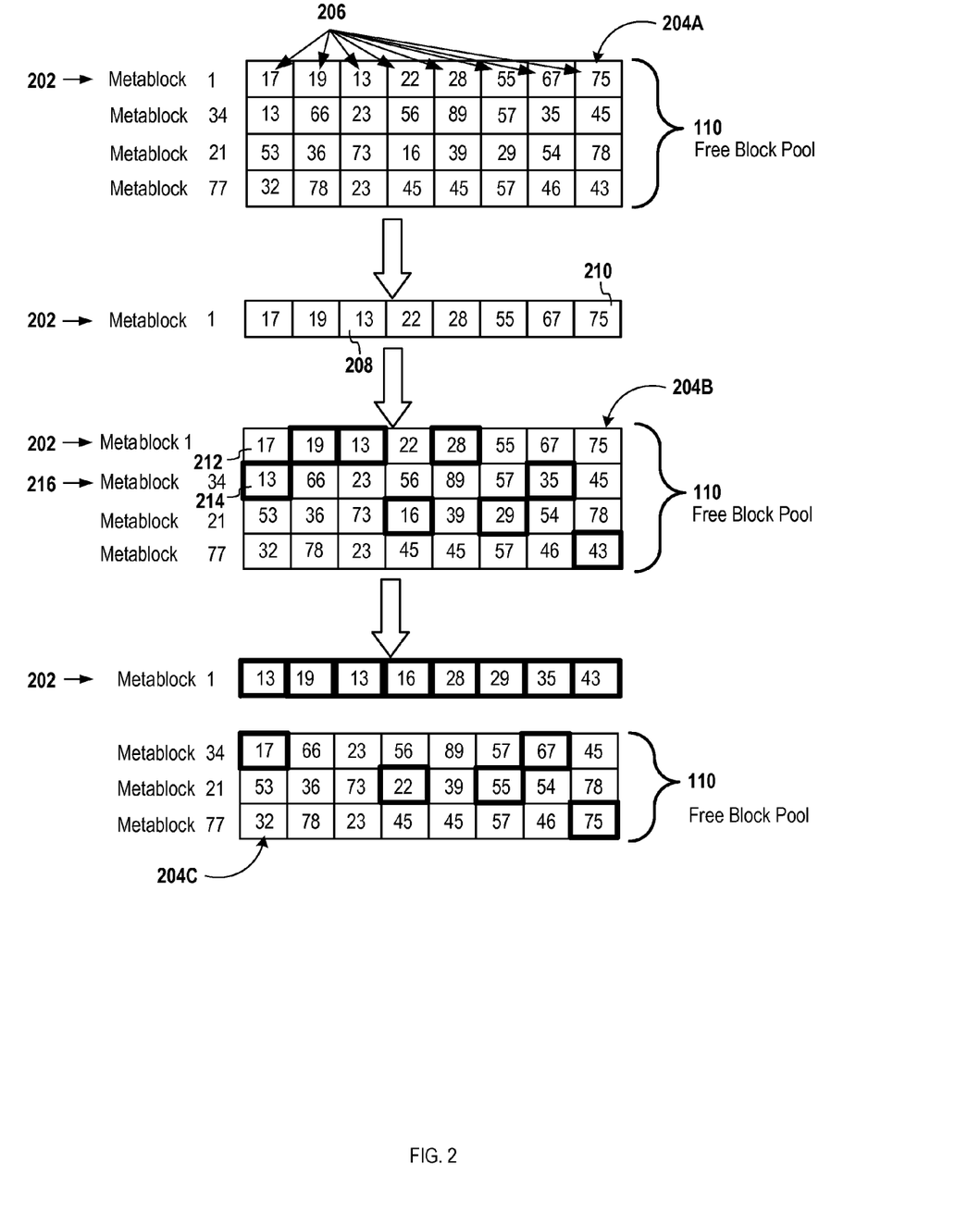
FIG. 2 illustrates selection of a metablock from a free block pool and relinking of the metablock.

FIG. 2 illustrates an example of a selection of a healthiest metablock 202 from the free block pool 110. Tables 204A, 204B, and 204C in FIG. 2 include a row for each of the metablocks 124 in the free block pool 110, and a column for each of the physical structures 118 on which the physical blocks 120 are located. Each cell in a row represents a corresponding one of the physical blocks 120 that is included in the metablock represented by the respective row. Each one of the cells includes the health indicator 206 of the physical block represented by the respective cell. Each one of the health indicators 206 illustrated in FIG. 2 is Block Health Meter (BHM). The lower the BHM, the healthier the block. Conversely, the higher the BHM, the less healthy the block.

The selector 130 may select the metablock 202 from the free block pool 110 based on the metablock 202 having the best health of the metablocks 124 in the free block pool 110. The metablock 202 having the best health may be determined, for example, from the least healthy of the physical blocks 120 of each of the metablock 202. The maximum BHMs (least healthy) of the physical blocks 120 of each of the four metablocks 120 (designated metablocks 1, 34, 21, and 77) in the free block pool 110 illustrated in FIG. 2 are 75, 89, 78, and 78, respectively. Metablock 1 has the lowest maximum BHM of the metablocks 120 in the free block pool 110. Accordingly, metablock 1 having a maximum BHM of 75 is the selected metablock 202. In other examples, the healthiest metablock may be determined and/or selected using different criteria.

The health analyzer 132 of the adaptive wear leveling module 114 may determine whether the selected metablock 202 is to be relinked based on the health of the selected metablock 202. For example, the health analyzer 123 may determine that the selected metablock 202 is to be relinked based on a determination that a variance in health of the physical blocks 120 of the selected metablock 202 exceeds a threshold level.

The variance in health may be the difference between the health indicator 206 of the healthiest block 208 of the selected metablock 202 and the health indicator 206 of the least healthy block 210 of the selected metablock 202. If the variance exceeds the threshold level, then the health analyzer 132 may determine that the selected metablock 202 is to be relinked. Alternatively, if the variance does not exceed the threshold level, then the health analyzer 132 may determine that the selected metablock 202 is not to be relinked.

The threshold level is 50 BHM in the example illustrated in FIG. 2. The difference between the health indicator 206 of the healthiest block 208 of the selected metablock 202 and the health indicator 206 of the least healthy block 210 of the selected metablock 202 is 75-13, which is 62 BHM. Because 62 BHM exceeds the threshold level of 50 BHM, the health analyzer 132 determines that the selected block 202 is to be relinked. In other examples, the health analyzer 132 may use a different threshold level and/or a different algorithm to determine whether the selected block 202 is to be relinked.

If the selected metablock 202 is not to be relinked, then the adaptive wear leveling module 114 may remove the selected metablock 202 from the free block pool 110 and make the selected metablock 202 available to the module that requested the metablock. For example, the wear leaving module 114 may make the selected metablock 202 available (142) to the write module 112 or available (138) to the static wear leveling module 115. The write module 112, for example, may then write the host data to the selected metablock 202, or the static wear leveling module 115 may relocate data to the selected metablock 202.

Alternatively, if the selected metablock 202 is to be relinked, then the relinker 134 may replace a physical block 212 of the selected metablock 208 in the selected block 202 with, for example, a healthier physical block 214 of another metablock 216. The physical block 212 to be replaced in the selected metablock 208 and the replacement physical block 214 may be on a common structure 118 of the semiconductor memory 102, such as on a common plane or a common die of the semiconductor memory 102.

Replacing the physical block 212 of the selected metablock 202 with the other physical block 214 may be part of a swap in some examples. In other words, the relinker 134 may swap the physical block 212 of the selected metablock 202 with the healthier physical block 214 of the other metablock 216, thereby replacing the physical block 212 of the selected metablock 202 with the replacement physical block 214. In an alternative example in which the selected metablock 202 is to be the least healthy metablock in the free block pool 110, then the relinker 134 may swap the physical block 212 of the selected metablock 202 with a less healthy physical block 212 of another metablock of the free block pool 110.

In some examples, such as where the selected metablock 202 is to be the healthiest metablock, the relinker 134 may swap each respective physical block of the selected metablock 202 with a corresponding physical block of one or more of the other metablocks in the free block pool 110 if the corresponding physical block is healthier than the respective physical block of the selected metablock 202 and the corresponding physical block is located on the same one of the structures 118 that the respective physical block of the selected metablock 202 is located. The table 204B in FIG. 2 identifies the healthiest physical block in each column with a square having a thicker border than the other squares in the respective column. As a reminder, each column may represent a corresponding one of the structures 118 of the semiconductor memory 102. The second, third and fifth physical blocks of the selected metablock 202 already include the healthiest blocks on their respective structure 118. However, the first, fourth, sixth, seventh, and eight physical blocks of the selected metablock 202 are not the healthiest blocks in their respective structures 118. Accordingly, the healthiest block 214 in the first structure, which is included in metablock 34, may be swapped with the first block 212 of the selected metablock 202. Similarly, the healthiest block in the fourth structure, which is included metablock 21, may be swapped with the fourth block of the selected metablock 202. The healthiest block in the sixth structure, which is included in metablock 21, may be swapped with the sixth block of the selected metablock 202. The healthiest block in the seventh structure, which is included metablock 34, may be swapped with the seventh block of the selected metablock 202. The healthiest block in the eighth structure, which is included in metablock 77, may be swapped with the seventh block of the selected metablock 202.

In some examples, such as where the selected metablock 202 is to be the least healthy metablock, the relinker 134 may swap each respective physical block of the selected metablock 202 with a corresponding physical block of one or more of the other metablocks in the free block pool 110 if the corresponding physical block is less healthy than the respective physical block of the selected metablock 202 and the corresponding physical block is located on the same one of the structures 118 that the respective physical block of the selected metablock 202 is located.

After the relinker 134 has relinked the selected metablock 202, the adaptive wear leveling module 114 may remove the selected metablock 202 from the free block pool 110 and make the selected metablock 202 available to the module that requested the metablock. For example, the wear leaving module 114 may make the selected metablock 202 available (142) to the write module 112 or available (138) to the static wear leveling module 115.

Figure 3:
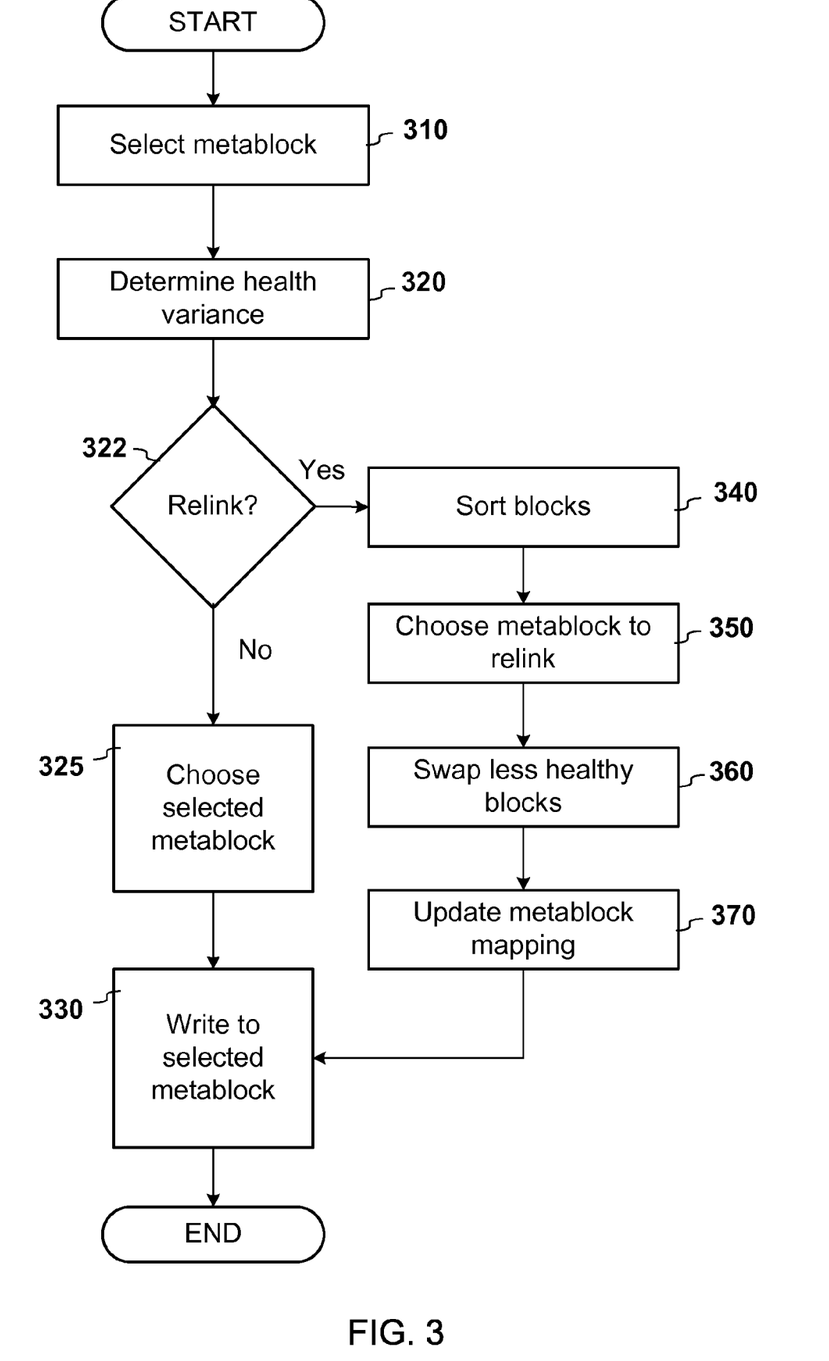
FIG. 3 illustrates a flow diagram of the logic of an example of a metablock relinking system.

As described in reference to FIG. 3, the metablock selected by the selector 130 may not necessarily be the metablock that the relinker 134 chooses to perform the relinking process on. FIG. 3 illustrates a flow diagram of the logic of an example of the metablock relinking system 100.

Operations may begin by selecting (310) the metablock 202 from the free block pool 110 based on the health of the metablocks 124. In one example, the metablock 202 selected from the free block pool 110 may be the metablock 202 whose least healthy block is healthier than the least healthy block of any of the other metablocks in the free block pool 110. In some examples, the metablock 202 may be selected every time a free block is requested from the free block pool 110. Alternatively or in addition, the metablock 202 may be selected if a different event occurs.

The variance in the health of the blocks 120 of the selected metablock 202 may be determined (320). For example, the difference between the maximum BHM and the minimum BHM of the blocks 120 of the selected metablock 202 may be calculated.

A determination (322) whether to relink the selected metablock 202 may be determined. For example, if the delta between the maximum BHM and the minimum BHM of the blocks 120 of the selected metablock 202 is greater than the threshold value, then the selected metablock 202 is to be relinked. Alternatively, if the difference between the maximum BHM and the minimum BHM of the blocks 120 of the selected metablock 202 is less than or equal to the threshold value, then the selected metablock 202 is not to be relinked.

If none of the metablocks 124 are to be relinked, then operations may proceed by choosing (325) the selected metablock 202 for writing. Data may be written (330) to the chosen metablock, which is the selected metablock 202.

Alternatively, if the selected metablock 202 is to be relinked, then operations may proceed by sorting (340) the physical blocks 120 on each respective one of the physical structures 118 across the metablocks 124 of the free block pool 110 by the health of the blocks 120. As a result of the sorting, n ordered lists may be obtained, where n is the number of physical structures 118. In some examples, n may be the number of blocks 120 in each of the metablocks 124. The healthiest block on each of the physical structures 118 may be determined from the ordered lists. In addition, each metablock that includes the healthiest block on each corresponding one of the physical structures 118 may be determined from the ordered lists.

From the ordered list, the metablock having the highest number of the healthiest blocks may be chosen (350). Choosing this metablock may reduce the extent of relinking that is performed. The chosen metablock may or may not be the same as the selected metablock 202.

The physical blocks 120 of the chosen metablock that are not the healthiest blocks on their respective physical structures 118, may be swapped (360) with the healthiest blocks on their respective physical structures 118. The metablock mapping 108 may be updated (370) to reflect the relinking of the metablocks 124. Operations may proceed to writing (330) data to the chosen metablock that was relinked.

The operations may be executed in a different order than illustrated in FIG. 3. The logic may include additional, different, or fewer operations than illustrated in FIG. 3. In one such example, the operations may not include choosing (350) a metablock—instead, the less healthy blocks may be swapped (360) into the metablock originally selected (310).

In an example in which the least healthy metablock is desired and selected (310) from the free block pool 110, some of the operations may be different than illustrated in FIG. 3. If the selected metablock 202 is to be relinked, then operations may proceed by sorting (340) the physical blocks 120 on each respective one of the physical structures 118 across the metablocks 124 of the free block pool 110 by the health of the blocks 120. However, the unhealthiest block on each of the physical structures 118 may be determined from the ordered lists. In addition, each metablock that includes the unhealthiest block on each corresponding one of the physical structures 118 may be determined from the ordered lists.

From the ordered list, the metablock having the highest number of the unhealthiest blocks may be chosen (350). In some examples, choosing this metablock may reduce the amount of relinking that is performed than if the originally selected metablock were chosen. The chosen metablock may or may not be the same as the selected metablock 202. The physical blocks 120 of the chosen metablock that are not the unhealthiest blocks on their respective physical structures 118, may be swapped (360) with the unhealthiest blocks and/or healthier blocks on their respective physical structures 118.

The metablock relinking system 100 may be implemented with additional, different, or fewer components than illustrated in FIGS. 1A and 1B. For example, the system 100 may include just the adaptive wear leveling module 114. In another example, the semiconductor memory 102 may include multiple memory devices and/or chips. The metablock mapping 108, the free block pool 110, and/or the controller memory may be included in the semiconductor memory 102 in some examples. Alternatively or in addition, the metablock mapping 108 and/or the free block pool 110 may be included in the controller memory.

The system 100 may be implemented in any suitable form. For example, the system 100 may be included in a flash drive, a solid state drive, a hard drive, a storage area network (SAN), or any other read/writeable computer-readable storage medium that includes solid state memory.

The controller 104 may be in communication with the free block pool 110 and the metablock mapping 108. The controller 104 may also be in communication with additional elements, such as the controller memory if the controller memory is external to the controller 104, and/or a central processing unit. Examples of the controller 104 may include a microcontroller, a general processor, a central processing unit, an application specific integrated circuit (ASIC), a digital signal processor, a field programmable gate array (FPGA), a digital circuit, and/or an analog circuit.

The controller 104 may be and/or include one or more devices operable to execute logic. The logic may include computer executable instructions or computer code embodied in the controller memory or in other memory, that when executed by the controller 104, cause the controller 104 to perform the features the logic is configured to perform.

Each component may include additional, different, or fewer components. For example, the controller memory may include just the adaptive wear leveling module 114. Alternatively, the controller memory may include modules in addition to those illustrated in FIG. 1B.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

For convenience, this document refers to groups of the physical blocks 120 as the metablocks 124. However, it will be understood that the metablock may be equivalent to a "megablock," which may be formed by a collection of the metablocks 124. Accordingly, the metablock relinking system 100 may also be a megablock relinking system.

The system 100 may be implemented in many different ways. Each module, such as the write module 112, the adaptive wear leveling module 114, the selector 130, the health analyzer 132, and the relinker 134, may be hardware or a combination of hardware and software. For example, each module may include a circuit such as an application specific integrated circuit (ASIC), a Field Programmable Gate Array (FPGA), a circuit, a digital logic circuit, an analog circuit, a combination of discrete circuits, one or more gates, a processor, a microcontroller, and/or any other type of hardware. Alternatively or in addition, each module may include memory hardware, such as a portion of the controller memory, for example, that comprises instructions executable with the controller 104 or other processor to implement one or more of the features of the module. If any one of the modules includes the portion of the memory that comprises instructions executable with the processor, the module may or may not include the processor. In some examples, each module may just be the portion of the controller memory or other physical memory that comprises instructions executable with the controller 104 or other processor to implement the features of the corresponding module without the module including any other hardware. Because each module includes at least some hardware even when the included hardware comprises software, each module may be interchangeably referred to as a hardware module, such as the write hardware module 112, the wear leveling hardware module 114, the selector hardware 130, the health analyzer hardware 132, and the relinker hardware 134.

Some features are described as stored in a computer readable storage medium (for example, as logic implemented as computer executable instructions or as data structures in memory) in some examples. Parts of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM (Random Access Memory), flash memory, or any other type of computer readable storage medium or storage media. The computer readable storage medium may include any type of non-transitory computer readable medium, such as a CD-ROM, a volatile memory, a non-volatile memory, ROM (Read Only Memory), RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs or modules, and/or distributed across several memories and processors. Moreover, the various modules are but examples of such functionality and any other configurations encompassing similar functionality are possible. All of the discussion, regardless of the particular implementation described, is exemplary in nature, rather than limiting.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which may also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices may be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions may also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations may be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories may be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An apparatus for metablock relinking, the apparatus comprising a controller configured to:
   determine a first metablock for relinking in response to a variance in health indicators of physical blocks of the first metablock exceeding a threshold level;
   determine that a first physical block of the first metablock comprises a different health than a second physical block of a second metablock based on health indicators, each of the health indicators indicates an extent to which a respective one of the first and the second physical blocks may be used before the respective one of the first and the second physical blocks becomes defective; and
   relink the first metablock through a replacement of the first physical block of the first metablock with the second physical block of the second metablock based on the determination that a health of the first physical block of the first metablock is different than the second physical block of the second metablock, each logical block of a block storage device is mappable to a corresponding metablock.

2. The apparatus of claim 1, wherein each of the health indicators is a Block Health Meter.

3. The apparatus of claim 1, wherein each of the health indicators is based on an error rate of the respective one of the first and second physical blocks.

4. The apparatus of claim 1, wherein each of the health indicators is based on a program/erase cycle of the respective one of the first and second physical blocks.

5. The apparatus of claim 1, wherein the first physical block of the first metablock is replaced with the second physical block of the second metablock also based on a determination that the first physical block and the second physical block are on one of multiple planes.

6. The apparatus of claim 1, wherein the controller is further configured to determine the first metablock is to be relinked based a difference in health between a least healthy physical block of the first metablock and a healthiest physical block of the first metablock.

7. The apparatus of claim 1, wherein the controller is further configured to swap, in response to the determination that the first metablock is to be relinked, each respective physical block of the first metablock with a corresponding physical block of one or more metablocks if the corresponding physical block of the one or more metablocks less healthy than the respective physical block of the first metablock and is located on a same semiconductor memory structure as that the respective physical block of the first metablock is located, wherein physical blocks of each metablock are distributed across semiconductor memory structures.

8. A system comprising:
   a semiconductor memory comprising a plurality of physical blocks, each metablock is mapped to a corresponding set of physical blocks, and each logical block is treated as a physical block by a file system;
   a health analyzer configured to determine a variance in health of the physical blocks of a first metablock, and to determine that the variance satisfies a threshold level for relinking, wherein the variance comprises a difference between health indicators of the physical blocks of the first metablock, and the first metablock includes no defective physical blocks; and
   a relinker configured to replace a first physical block of the first metablock with a second physical block of a second metablock based on a health of the first physical block relative to a health of the second physical block.

9. The system of claim 8 further comprising a selector configured to select the first metablock from a free block pool.

10. The system of claim 9, wherein the selector is configured to select the first metablock from the free block pool based on a determination the first metablock is healthier than one or more metablocks that are in the free block pool.

11. The system of claim 9, wherein the selector is configured to select the first metablock from the free block pool based on a determination that a least healthy physical block of the first metablock is healthier than every least healthy physical block of each metablock, other than the first metablock, that is included in the free block pool.

12. The system of claim 8, wherein a health indicator of each of the physical blocks indicates a health level of a respective one of the physical blocks, and wherein the variance in health is determined by the health analyzer as a difference between a highest and a lowest of the health indicators of the physical blocks of the first metablock.

13. The system of claim 8, wherein the semiconductor memory is three dimensional memory.

14. A method to relink metablocks, the method comprising:
   selecting, from a free block pool, a first metablock mapped to a first set of physical blocks of a semiconductor memory, each metablock of the semiconductor memory is mapped to a corresponding set of physical blocks of the semiconductor memory, each logical block of a block storage device that includes the semiconductor memory is mappable to a corresponding metablock;
   selecting the first metablock for relinking in response to a variance in health of the physical blocks in the first set of physical blocks of the first metablock exceeds a threshold level indicating the first metablock is to be relinked, yet none of the physical blocks of the first metablock are defective; and
   relinking the first metablock by replacing a first physical block of the first metablock with a second physical block of a second metablock in the free block pool.

15. The method of claim 14, wherein the selecting the first metablock comprises selecting the first metablock from the free block pool based on an indication that the first metablock is healthier than other metablocks in the free block pool.

16. The method of claim 14 further comprising selecting the second metablock based on an indication that the second physical block is less healthy than the first physical block, wherein the second physical block is located on a same structure of the semiconductor memory as the second physical block, wherein physical blocks that are included in the corresponding set of physical blocks of each metablock are distributed across structures of the semiconductor memory.

17. The method of claim 14 further comprising swapping, in response to the selecting the first metablock for relinking, the first physical block of the first metablock with the second physical block of the second metablock, wherein the swapping comprises the replacing the first physical block with the second physical block.

18. The method of claim 14 further comprising swapping, in response to the determination that the first metablock is to be relinked, each respective physical block of the first metablock with a corresponding physical block of the second metablock if the corresponding physical block of the second metablock is a healthiest physical block of the physical blocks that are located on a same structure of the semiconductor memory that the respective physical block of the first metablock is located, wherein physical blocks that are included in the corresponding set of physical blocks of each metablock are distributed across structures of the semiconductor memory.

* * * * *